Patented Jan. 8, 1946

2,392,618

UNITED STATES PATENT OFFICE 2,392,618

BONDING SURFACES

Omar H. Smith, West Englewood, N. J., assignor to United States Rubber Company, New York, N. Y., a corporation of New Jersey No Drawing. Application May 13, 1942,
Serial No. 442,861

5 Claims. (Cl. 154—2)

This invention relates to improved means for bonding rubber to metals and other surfaces.

An object of the invention is to produce a superior adhesive for bonding rubber to metals. Other objects will be apparent from the following description.

The superior bonding means comprises the combination of rubber chloride with a depolymerized unvulcanized rubber derivative. Preferably, the rubber chloride and the rubber derivative are applied separately, but a mixture of the two materials can be used successfully.

The chlorinated rubber will liberate hydrogen chloride on heating at ordinary rubber vulcanizing temperatures, for example, at 220 to 320° F. This property is a factor in this invention.

*Preparation of rubber chloride.*—2 parts by weight of rubber (Pale Crepe) are dissolved in 98 parts of carbon tetrachloride. The solution is warmed to 60–70° C. and kept at this temperature throughout the chlorination. Chlorine is bubbled through the solution until the increase in weight is greater than the original weight of the rubber. A reflux condenser is used in order to prevent the loss of solvent. After the chlorination is completed the chlorinated rubber is precipitated by adding ethyl alcohol. The precipitate is dried at atmospheric temperature. The chlorine content of the final product can be varied from 55 to 69% without noticeably affecting its adhesive properties. The chlorinated rubber prepared by this method will be referred to herein as Chlorinated Rubber C.

The rubber derivative can be prepared from rubber, with or without the separate addition of vulcanizing and/or filling ingredients. The best results are obtained, however, by depolymerizing, in the presence of air (oxygen), the raw rubber dissolved in an organic solvent and containing free sulfur, zinc oxide, and an accelerator. A preferred mix (herein referred to as Intermediate A) is prepared from zinc oxide, sulfur, and benzothiazole disulfide (Altax) mixed and dissolved in an organic solvent, and the solution heated until the viscosity is decreased by the heat treatment. The temperature of heating the rubber solution should not rise above about 120° C., otherwise the bonding effect of the rubber derivative, when used in conjunction with the rubber chloride, is materially weakened. Ordinary rubber cement is not compatible with the rubber chloride.

The following examples are given in illustration of the invention (parts are by weight):

*Example 1.—Preparation of Intermediate A*

Intermediate A is prepared from a compound consisting of 100 parts rubber (Pale Crepe), 3 parts zinc oxide, 8 parts sulfur, and 1 part benzothiazyl disulfide by weight. This compound will be referred to subsequently as Compound 5B. The compound is broken down on a mill and dissolved in toluene, xylene or solvent naphtha. The solution is heated in an air vented container at 100–110° C. until the viscosity drops to approximately 5 centipoises, the rubber concentration being 12% by weight. The viscosity is measured at 25° C. After the heating process is completed, the concentration of the final product is increased to an approximately 25% solution in the solvent, by distilling off a portion of the solvent under vacuum.

The rubber compound can be varied widely. A workable product can be obtained even if sulfur, accelerator, and zinc oxide are omitted. Zinc oxide can be omitted without damage to the product if the heating time is increased approximately 10%. However, the compound should desirably contain sulfur or accelerator, and preferably both sulfur and accelerator. The time of heating must be increased approximately 70%, when either sulfur or accelerator is omitted. If both sulfur and accelerator are omitted, the time of heating must be at least doubled, and the final product gives noticeably less adhesion.

The temperature of heating should not exceed 120° C., otherwise gelling occurs. Gelling also occurs if the concentration is too high (above 15%) during the initial stages of heating.

Intermediate A cannot be produced in the absence of oxygen (air). For this reason the boiling point of the solvent must be greater than the temperature of the heat treatment; otherwise the solvent vapours above the liquid will expel the air. Either aromatic or aliphatic solvents can be used if the boiling point lies between approximately 120 and 150° C.

The Intermediate A is most effective when it has a viscosity of approximately 5 centipoises, measured at 25° C. with a rubber concentration of 12% (by weight). Its effectiveness is greatly decreased when its viscosity is as high as 15 centipoises or as low as 2.5 centipoises.

It appears that in the above treatment, the rubber is simultaneously partially vulcanized, partially oxidized, and partially depolymerized. Intermediate A is vulcanizable.

Examples illustrating the operation of the invention follow. In evaluating adhesion in Examples 2 to 6 inclusive a stripping method was used. In this method metal strips (6" x 1½" x ⅛") which had been sandblasted and cleaned with ethyl alcohol were coated with the adhesive and allowed to air dry. A coat of rubber containing a fabric insertion was then applied and the sample was cured between platens under moderate pressure. The pressure was controlled by means of shims which were placed at the sides of the test-piece and which permitted the rubber cover coat to be compressed from an initial thickness of .100" to a final thickness of .085". Subsequent to curing the pull which was required to separate the cover coat from the metal was determined. This test will be referred to subsequently as Test T.

The cover compound consisted (by weight) of 100 parts rubber, 50 parts zinc oxide, 1 part stearic acid, 1 part mercapto benzothiazole, and 3 parts sulfur. This compound with the fabric insertion will be referred to subsequently as cover compound R.

Example 2

A coat of Chlorinated Rubber C was applied to the surface of a metal test plate (6" x 1½" x ⅛") and air dried. A coat of Intermediate A was then applied. The coated plate was exposed to the air for 30 minutes, after which the rubber cover compound R was applied. The sample was cured by heating between platens for 60 minutes at 280° F., as described previously under "Test T." A pull of 25 pounds was applied without separating the cover coat from the metal.

Example 3

A test was carried out by the method used in Example 2, employing 2 coats of a mixture of 3 parts rubber chloride C and 1 part Intermediate A (by weight) as the adhesive layer. A pull of 25 pounds was applied without separating the cover coat from the metal.

Example 4

A test was carried out by the method used in Example 2, employing chlorinated rubber C but omitting Intermediate A.

The cover coat was separated from the metal by a pull of 4 pounds, illustrating the importance of Intermediate A to the adhesive.

Example 5

A test was carried out by the method used in Example 2, employing chlorinated rubber C and substituting ordinary rubber cement (prepared from compound 5B) for Intermediate A.

The rubber cover coat was separated from the metal by a pull of only 4 pounds, illustrating the impossibility of substituting ordinary rubber cement for Intermediate A.

Example 6

A test was carried out by the method used in Example 2, in which the usual commercial rubber chloride was substituted for chlorinated rubber C and commercial Vulcolac was substituted for Intermediate A. Vulcolac in an unvulcanizable depolymerized rubber in which the depolymerization has not been carried out under the conditions described for the preparation of Intermediate A.

The rubber cover coat was separated from the metal by a pull of 9 pounds, illustrating the relatively poor results obtained by substituting commercial materials for those prepared according to this invention.

Example 7

A coat of chlorinated rubber C was applied to a bronze A. S. T. M. test plug (88% copper) and air dried. A coat of Intermediate A was applied and the coated plug was exposed to the air for 30 minutes. A hard rubber cover coat was then applied. The plug was assembled according to the standard A. S. T. M. method (Designation 429-36T) after which it was wrapped in sheeting and cured by heating it for 4 hours at 35 pounds open steam.

The hard rubber cover compound in parts by weight consisted of 100 rubber, 53.3 zinc oxide, 50 whiting, 5 iron oxide, 5 vaseline, 5 accelerator, 15 lime, and 50 sulfur.

Subsequent to curing, the sample was tested at room temperature and gave adhesion of 610 pounds per square inch.

The invention can be used for bonding hard rubber, soft rubber, and similar materials to iron, steel, copper, aluminum, bronze, and other metals.

Having thus described my invention, what I claim and desire to protect by Letters Patent is:

1. A method which comprises adhesively bonding a rubber composition to a metal surface by means of heat and pressure and an intermediately disposed layer which includes rubber chloride in combination with a rubber derivative obtained by the depolymerizing action of heat and oxygen on dissolved raw rubber in the presence of free sulphur and a vulcanization accelerator, the amounts of both the chloride and depolymerized rubber being substantial, and the heating and amount of sulphur being sufficient to bring about a degree of vulcanization equivalent to that attained by heating the rubber in 12 percent solution until the viscosity of the solution, measured at 25° C., is approximately five centipoises.

2. A method which comprises adhesively bonding a rubber composition to a metal surface by means of heat and pressure and an intermediately disposed layer which includes rubber chloride in combination with a rubber derivative obtained by the depolymerizing action of heat and oxygen on dissolved raw rubber in the presence of free sulphur, zinc oxide, and a vulcanization accelerator, the amounts of both the chloride and depolymerized rubber being substantial, and the heating and amount of sulphur being sufficient to bring about a degree of vulcanization equivalent to that attained by heating the rubber in 12 percent solution until the viscosity of the solution, measured at 25° C., is approximately five centipoises.

3. A bonding agent for adhesively uniting a rubber composition to metal which comprises rubber chloride in combination with a rubber derivative obtained by the depolymerizing action of heat and oxygen on dissolved raw rubber in the presence of free sulphur and a vulcanization accelerator, the amounts of both the chloride and depolymerized rubber being substantial, and the heating and amount of sulphur being sufficient to bring about a degree of vulcanization equivalent to that attained by heating the rubber in 12 percent solution until the viscosity of the solution, measured at 25° C., is approximately five centipoises.

4. A composite article comprising a metal base united to a rubber composition by means of a bonding agent comprising an intermediately disposed layer which includes rubber chloride in combination with a rubber derivative obtained by the depolymerizing action of heat and oxygen on dissolved raw rubber in the presence of free sulphur, and a vulcanization accelerator, the amounts of both the chloride and depolymerized rubber being substantial, and the heating and amount of sulphur being sufficient to bring about a degree of vulcanization equivalent to that attained by heating the rubber in 12 percent solution until the viscosity of the solution, measured at 25° C., is approximately five centipoises.

5. A bonding agent for uniting rubber to metal surfaces which comprises rubber chloride in combination with a rubber derivative obtained by the depolymerizing action of heat and oxygen on dissolved raw rubber in the presence of about 8 percent of sulphur on the weight of the rubber, and a vulcanization accelerator, the amounts of both the chloride and depolymerized rubber being substantial, and the heating being sufficient to bring about a degree of vulcanization equivalent to that attained by heating the rubber in 12 percent solution until the viscosity of the solution has fallen to a value of approximately five centipoises at 25° C.

OMAR H. SMITH.